United States Patent
Prasad Kodaypak et al.

(10) Patent No.: US 12,407,594 B2
(45) Date of Patent: *Sep. 2, 2025

(54) MOBILITY NETWORK SLICE SELECTION

(71) Applicant: AT&T Intellectual Property I, L.P., Atlanta, GA (US)

(72) Inventors: Rajendra Prasad Kodaypak, Sammamish, WA (US); Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,203

(22) Filed: Jun. 24, 2024

(65) Prior Publication Data

US 2024/0348524 A1 Oct. 17, 2024

Related U.S. Application Data

(63) Continuation of application No. 18/164,906, filed on Feb. 6, 2023, now Pat. No. 12,021,723, which is a (Continued)

(51) Int. Cl.
*H04L 43/0882* (2022.01)
*H04L 43/0876* (2022.01)
(Continued)

(52) U.S. Cl.
CPC ...... *H04L 43/0882* (2013.01); *H04L 43/0876* (2013.01); *H04L 47/2416* (2013.01); (Continued)

(58) Field of Classification Search
CPC . H04L 43/0882; H04L 43/0876; H04L 43/20; H04L 47/2416; H04L 47/6265;
(Continued)

(56) References Cited

U.S. PATENT DOCUMENTS

2015/0046921 A1* 2/2015 Allen ............... G06F 9/4406 718/1
2018/0270820 A1* 9/2018 Gupta ............... H04W 28/082
(Continued)

FOREIGN PATENT DOCUMENTS

CN 110301143 A * 10/2019 ............. G06F 1/206
EP 3402232 A1 * 11/2018 ............ H04W 16/02
(Continued)

*Primary Examiner* — Richard G Keehn

(57) ABSTRACT

Core network slices that belong to a given operator community are efficiently tracked at the network control/user plane functions level, with rich data analytics in real-time based on their geographic instantiations. In one aspect, an enhanced vendor agnostic orchestration mechanism is utilized to connect a unified management layer with an integrated slice-components data analytics engine (SDAE), a slice performance engine (SPE), and a network slice selection function (NSSF) in a closed-loop feedback system with the serving network functions of one or more core network slices. The tight-knit orchestration mechanism provides economies of scale to mobile carriers in optimal deployment and utilization of their critical core network resources while serving their customers with superior quality.

20 Claims, 12 Drawing Sheets

Related U.S. Application Data continuation of application No. 17/647,910, filed on Jan. 13, 2022, now Pat. No. 11,595,285, which is a continuation of application No. 17/201,402, filed on Mar. 15, 2021, now Pat. No. 11,258,689, which is a continuation of application No. 16/100,087, filed on Aug. 9, 2018, now Pat. No. 10,986,010.

(51) Int. Cl.
| | |
|---|---|
| H04L 47/2416 | (2022.01) |
| H04L 47/625 | (2022.01) |
| H04L 47/80 | (2022.01) |
| H04W 24/08 | (2009.01) |
| H04W 28/16 | (2009.01) |
| H04W 48/18 | (2009.01) |

(52) U.S. Cl.
CPC ........ *H04L 47/6265* (2013.01); *H04L 47/801* (2013.01); *H04W 24/08* (2013.01); *H04W 28/16* (2013.01); *H04W 48/18* (2013.01)

(58) Field of Classification Search
CPC .. H04L 47/801; H04L 41/0897; H04W 24/08; H04W 28/16; H04W 48/18
See application file for complete search history.

(56) References Cited

U.S. PATENT DOCUMENTS

2019/0158425 A1\* 5/2019 Aronovich ............. H04L 43/20
2022/0217779 A1\* 7/2022 Taherzadeh Boroujeni ................ H04W 74/002

FOREIGN PATENT DOCUMENTS

EP 3445072 B1 \* 9/2019 ............ H04W 48/18
WO WO-2018206441 A1 \* 11/2018 ............ H04W 16/02

\* cited by examiner

MOBILITY NETWORK SLICE SELECTION

RELATED APPLICATIONS

This application is a continuation of U.S. patent application Ser. No. 18/164,906, filed on Feb. 6, 2023, now U.S. Pat. No. 12,021,723, which is a continuation of U.S. patent application Ser. No. 17/647,910, filed on Jan. 13, 2022, now U.S. Pat. No. 11,595,285, which is a continuation of U.S. patent application Ser. No. 17/201,402, filed on Mar. 15, 2021, now U.S. Pat. No. 11,258,689, which is a continuation of U.S. patent application Ser. No. 16/100,087, filed on Aug. 9, 2018, now U.S. Pat. No. 10,986,010, the entireties of which priority applications are hereby incorporated by reference herein.

TECHNICAL FIELD

The subject disclosure relates to wireless communications, e.g., a system and method for mobility network slice selection.

BACKGROUND

The wireless industry is quickly evolving from long term evolution (LTE) to fifth generation (5G) technologies with several pilot trials ongoing in various licensed spectrum allocations. While commercialization of Third Generation Partnership Project (3GPP) standards and first 5G commercial network deployments are anticipated at the end of this decade, several feature enhancements are still required to reshape the standards in being able to drive cost-effective and smart network designs. Such designs need to enable the benefits of 5G technologies by supporting commercially viable applications and services to support consumers, businesses, enterprises, industrial internet of things (IoT), and their customers.

Traditional mobility core network designs that have been architected, developed, and deployed using LTE technology are not adequate to meet the high-speed global mobile connectivity demands of the next decade. In addition, legacy LTE mobility core network functions and their serving equipment are largely localized in specific data center locations due to legacy requirements and do not offer complete flexibility.

With the shift to software-defined networking (SDN) and/or network functions virtualization (NFV) and open networking standards, the core network functions that will serve next-generation mobility technologies, including 5G, are to be sliced and be instantiated in any suitable edge office locations, besides central offices, for example, on demand. The ability to provide such core network functions creates new challenges for the network infrastructure providers to develop innovative and intelligent networking solutions that can deliver optimal connectivity and/or end user service quality.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
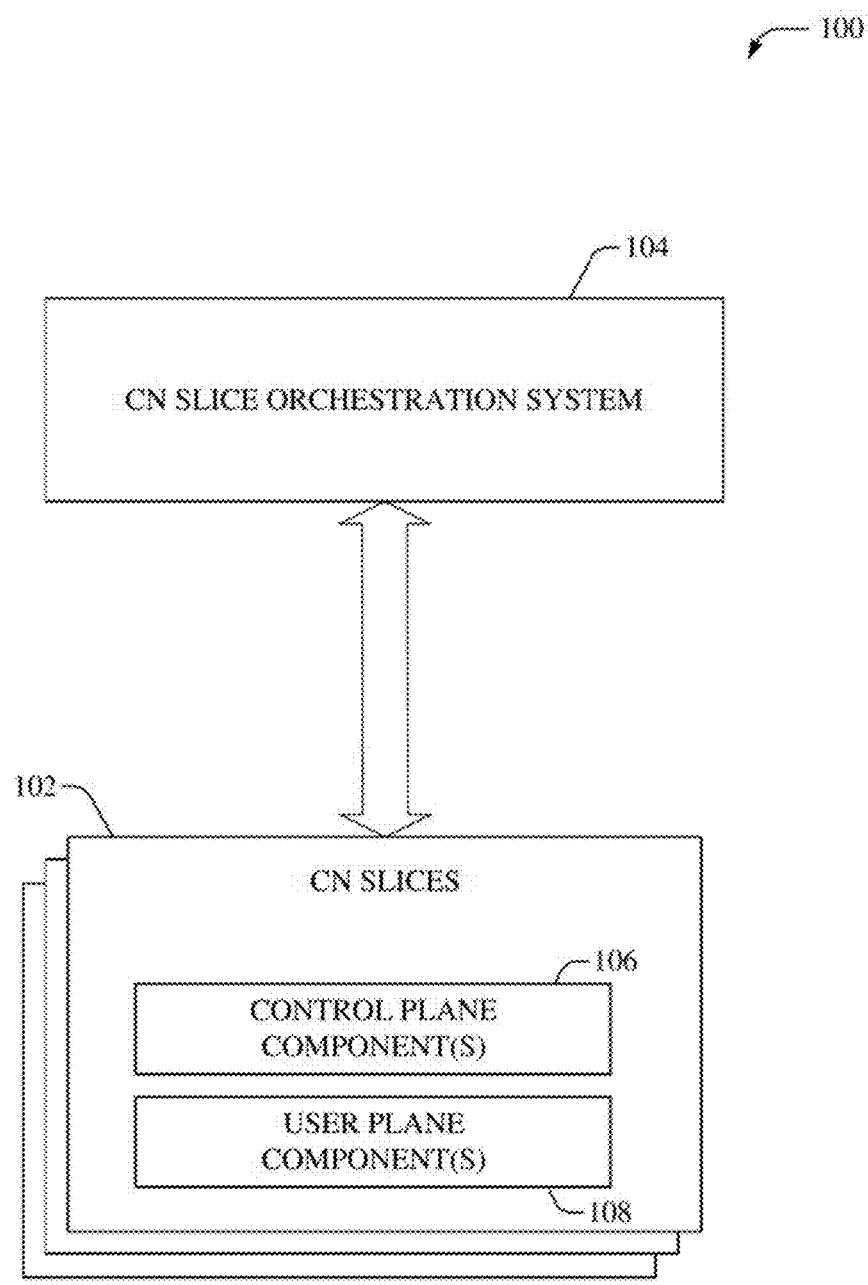
FIG. 1 illustrates an example system that facilitates network slice orchestration in accordance with the subject embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "engine," "center," "point," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Fifth generation (5G), Zigbee, or another IEEE 802.XX technology, low power wide area (LPWA) and/or non-3GPP standard based solutions, such as, but not limited to, Ingenu, Sigfox, and/or LoRa, etc. Additionally, substantially one or more aspects of the disclosed subject matter can be exploited in legacy (e.g., wireline) telecommunication technologies.

Networks supporting 5G cellular technologies (and/or other future technologies) are to be dynamic, flexible, adaptable, scale and serve the demands of a variety of mobile users, devices, applications, and/or services across various locations. The legacy LTE mobility core network functions and their serving equipment are largely localized in specific data center locations due to legacy requirements and do not offer complete flexibility. With the shift to software-defined networking (SDN) and/or network functions virtualization (NFV), and open networking standards, the core network functions that will serve next-generation mobility technologies (e.g., 5G) can be "sliced" and be instantiated in any suitable edge office locations, besides central offices, on demand. However, intelligent methods to self-coordinate, instantiate, monitor, measure, and/or de-instantiate core network functions in a slice and across multiple slices, elastically scale and/or de-scale do not exist in conventional systems. With new spectrum allocations and radio resources availability, the overall mobility network dynamics will become more complex. In one or more embodiments, systems and methods disclosed herein can efficiently track core network slices that belong to a given operator community at the network control/user plane functions level, with rich data analytics in real-time based on their geographic instantiations.

Systems and methods disclosed herein provide an enhanced core network slicing orchestration mechanism that works not only for the legacy mobility networks but also towards their evolution to a more mature NFV/SDN model when interworking with new network functions that will support 5G (and/or other next-generation) cellular technologies. The orchestration mechanism in this disclosure is vendor application software agnostic and ties a unified management layer with an integrated slice-components data analytics engine (SDAE), a slice performance engine (SPE), and a network slice selection function (NSSF) in a closed-loop feedback system with the serving network functions. Such a tight-knit orchestrator can provide economies of scale to mobile carriers in optimal deployment and utilization of their critical core network resources while serving their customers with superior quality.

Referring initially to FIG. 1, there illustrated is an example system 100 that facilitates network slice orchestration, according to one or more aspects of the disclosed subject matter. System 100 can facilitate slice orchestration and management for most any network that utilizes network slicing, for example, a 5G network. As mentioned, 5G networks can be highly resource intensive in terms of handling mobile-to-mobile and the 'internet of things' (M2M/IoT), augmented/virtual reality (AR/VR), tele-health, targeted mobile advertising, connected cars, and/or other services/technologies. These new services/technologies can require a wide range of aggregate bit rates, low latencies, device types and/or device capabilities, device densities, etc., to provide consistent end user quality for a given service in a heterogeneous networking environment. Given that a centralized network architecture model with a single set of standard mobility network functions can be extremely complex and expensive to deploy in a manner that can meet the demanding performance requirements for a wide variety of mobility services, network slicing concepts can enable use of standardized network elements and functions in a manner that can be dynamically re-configurable within a network operator architecture to be able to create and deliver a given mobility service. Logically slicing a core network into multiple virtual networks, hereinafter referred to as core network (CN) slice(s) 102, can enable designation of and/or optimization of the CN slice to meet dynamically changing demands on the CN.

Network slicing can transform a monolithic mobility networking architecture that has traditionally been used to service smartphones in the current wireless network provider industry. With the proliferation of new wireless technologies and next generation mobile devices, the connectivity and communication models can be expected to rapidly evolve and drive the adoption of new services which were not possible before. Moreover, as network functions transform from a physical to a virtual domain (e.g., in a cloud centric environment), this transformation can create innovative opportunities to be able to design fully programmable mobile networks, for example, network that can deliver a micro-service architecture. Programmable or adaptive network technology concepts can be applied to core networks and can be extended to radio access networks, to provide radio resources and create a robust network slicing concept that can work in a coordinated manner.

Generally, a slice can be a virtualization of a physical network that enables independent architecture, partitioning, and organization of computing resources in each slice. Moreover, network slices are a specific form of virtualization that allow multiple logical networks to run on top of a shared physical network infrastructure. This can facilitate flexibility that is typically not readily available in a monolithic embodiment of a physical network. A CN slice 102 can be a virtualization of one or more physical CN resources. Network slicing can create logically separate CN slices 102 of the core network entities running on common mobility infrastructure, wherein each slice can provide customized connectivity for a service (and/or class of service). Typically, a slice, e.g., CN slice 102, can be considered self-contained with regard to operation, traffic flow, performance, etc., and can have its own virtualized architecture and features, and can be individually provisioned in a network. The virtualization of physical network resources via slicing can simplify creation, management, and operation of slices, typically tailored to a type of functionality, environment, service, hardware, etc., to enable efficient consumption of network resources of the physical network. As examples, a first slice can have a first bandwidth and a second slice can have a different second bandwidth; a first slice can have a different latency than a second slice; a first slice can employ different virtual functions, e.g., VNFs, than those employed by a second slice; etc.

According to an embodiment, a CN slice orchestration system 104 can be utilized to manage (e.g., select, instantiate, and/or de-instantiate) the CN slices 102 for a particular service and/or to serve a particular device. The CN slice orchestration system 104 can comprise a multi-vendor agnostic operations and measurement intervention model along with a data analytics function that can be utilized to determine a composite view of all the insights into the various core network functions (e.g., data analytics across all network functions and their repositories within a slice and/or across multiple slices with suitable tags or identities). Further, the CN slice orchestration system 104 can have intelligence at the operating slice level and can directly communicate with a network slice selection function (NSSF) sub-system (not shown) to facilitate efficient and/or optimal steering of traffic. In an aspect, the CN slice orchestration system 104 can facilitate optimally addressing the end user/device requests for initial signaling connectivity associated with a given service.

In an aspect, the CN slice orchestration system 104 can be granular, such that, it can monitor and/or dynamically scale individual core network functions within a slice. In one aspect, the CN slice orchestration system 104 can track behaviors of, and/or raw data and metrics associated with, control plane component(s) 106 of a CN slice 102 and track behaviors of, and/or raw data and metrics associated with, user plane component(s) 108 of the CN slice 102, separately. The separate tracking provides network operators flexibility to optimally evaluate the utilization of resources of a slice, which in turn gives quality of metric attributes, for example, for the control plane component(s) 106 and user plane component(s) 108 independently. In an aspect, analytics that are originating from these components can be utilized (e.g., by the CN slice orchestration system 104) to perform intelligent decisions on how to evolve the network. Typically, since each slice is designed to have its own attributes the customized monitoring of each slice is critical. In an aspect, the CN slice orchestration system 104 can determine a portion, e.g., control plane component(s) 106 and/or user plane component(s) 108 elements that are to be scaled to be able to meet the requirements for a service for which the slice has been (and/or is to be) instantiated.

Figure 2:
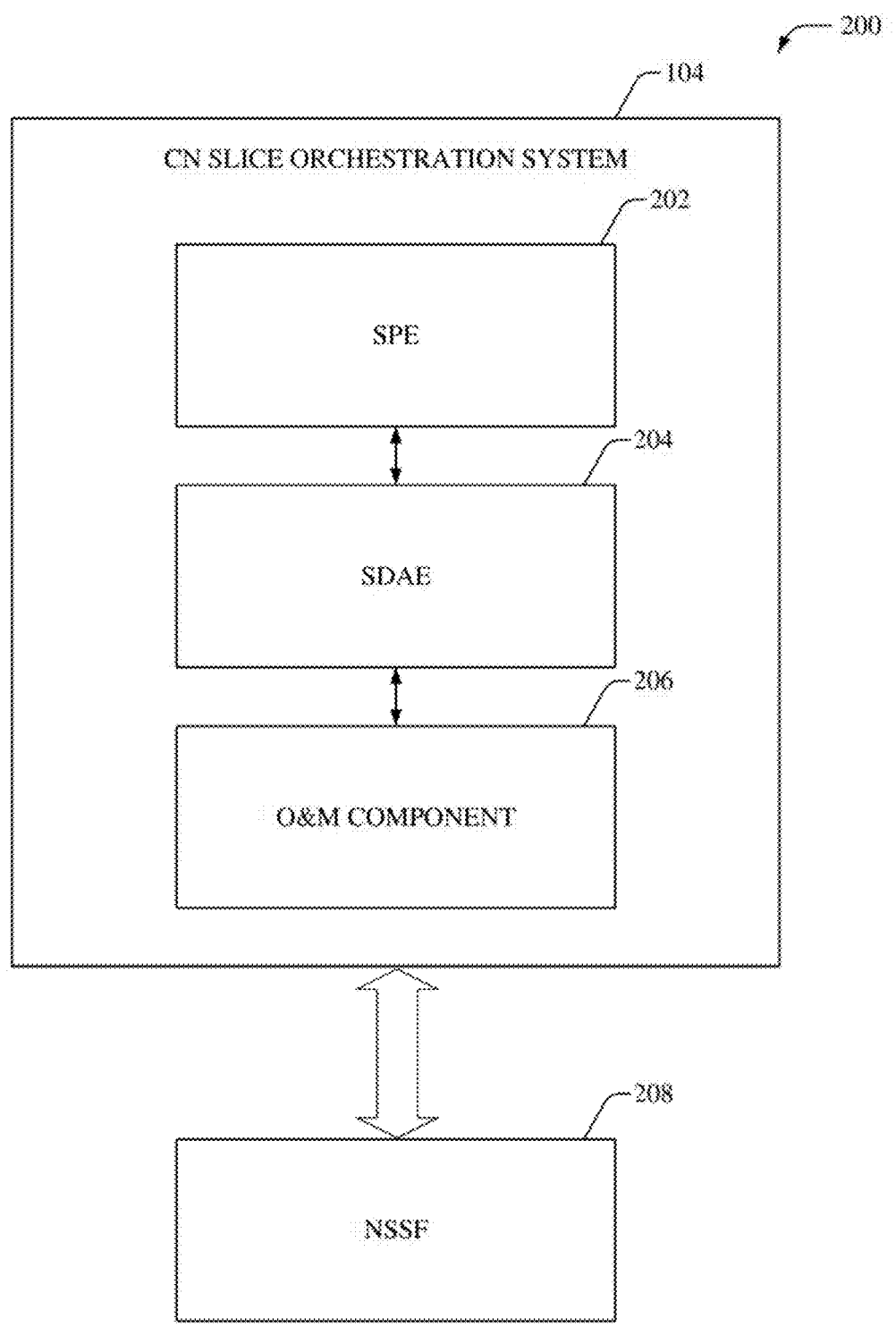
FIG. 2 illustrates an example system for efficient core network (CN) slice orchestration.

Referring now to FIG. 2, there illustrated is an example system 200 for efficient CN slice orchestration, in accordance with an aspect of the subject disclosure. In one aspect, the CN slice orchestration system 104 can comprise a slice performance engine (SPE) 202, a slice data analytics engine (SDAE) 204, and a multi-vendor agnostic operations and measurement (O&M) component 206 that can be utilized to monitor and/or scale portions (e.g., individual functions) of a CN slice. The CN slice orchestration system 104 can dynamically trigger CN network slice instantiation, de-instantiation, and/or selection (e.g., via direct communication with a NSSF 208) to optimally address the end user/device requests for initial signaling connectivity associated with a given service. It is noted that the CN slice orchestration system 104 can comprise functionality as more fully described herein, for example, as described above with regard to system 100.

As discussed above, the next generation of digital transformation in a high-speed mobile connected world will be triggered with 5G cellular systems and their continued evolution. Such technological advances are required and targeted to provide consumers, enterprises, governments, etc. with unprecedented connectivity capabilities beyond what is possible with traditional LTE/LTE-A based cellular technologies. Mobility network transformation with gradual adoption of open-standards based NFV and SDN principles can yield modular and flexible network functions design that can in turn enable efficient network slicing. While 3GPP standards have defined the initial 5G system architecture with several new functions, there are major technical gaps that are to be addressed with the efficient exchange of control and user plane procedures between the various network functions when delivering mobility services. In an aspect, the 5G system architecture comprises an access and mobility management function (AMF) that interacts with NSSF 208 via an N22 interface.

In conventional systems, the NSSF does not have direct connectivity to the rest of the network functions and/or a network repository function network repository function (NRF). The NSSF plays a crucial role in the determination of various systemic functions to be able to offer seamless global mobility services with the best network services quality. When a device registers to the network using 5G radio access technology, a radio node can send the registration request to the initial (e.g., default) AMF, which then interacts with a user data management (UDM) to obtain the slice selection information. The initial AMF can also communicate with the NRF to ensure that there are appropriate network function resources to steer the request to a targeted AMF as opposed to be served by the initial AMF. Traditionally, this AMF selection is static, for example, based on rules-based provisioning in the NSSF. Upon selection of a given AMF, the next set of functions such as the authentication server function (AUSF), UDM, policy control function (PCF), and/or session management function (SMF) are selected to complete the overall registration process. The traditional NSSF does not have direct interactions with the rest of the network functions and such a connectivity model has several shortcomings for an intelligent network design. Further, the re-routing of the signaling procedures, from the serving radio access node to initial AMF, followed by interactions with UDM and NRF to obtain the NSSF information to be able to route the request to the targeted AMF and subsequent network slice functions such as the AUSF, UDM, PCF, SMF, etc. does not provide an intelligent and/or optimal design approach. Moreover, such routing methods lead to unnecessary signaling events, retransmissions that result in inappropriate and inefficient utilization of the data center resources. In contrast, system 200 provides direct connectivity between the NSSF 208 with the CN slice orchestration system 104 to reduce the unnecessary signaling and provide the NSSF 208 with real-time analytics associated with individual CN function of a slice to facilitate efficient CN slice selection and/or scaling.

According to an embodiment, the SDAE 204 can determine a composite view of the data analytics across all CN functions and their repositories within a slice and across multiple slices with suitable tags or identities. The SDAE 204 can synthesize the raw data feeds received from the O&M component 206 (and/or collected directly from the CN functions) and process them with rules-based logic (e.g., operator-defined) to create configurable data maps and/or threshold alerts per slice identity. These maps can be sorted on a variety of triggers such as, but not limited to, the time-of-day, user equipment (UE) categories, UE network capabilities, priority access, UE context information, geolocation, capacity utilization, services being served in real-time, etc. The SDAE 204 can interact with the NSSF 208 through an open-standards (e.g., non-proprietary and/or vendor agnostic) interface/APIs to support push-pull model of data exchange in real-time, for example, based on one or more operator defined rules.

In an aspect, the SPE 202 can interwork with SDAE 204 to determine the right slice allocations required to meet the basic platform resources (e.g., storage, compute, and/or memory resources) and service specific behaviors (e.g., behavior for ultra low latency slice, IoT slice, behavior for enhanced mobile broadband slice, etc.). Further, in another aspect, the SPE 202 can interwork with SDAE 204 to drive the instantaneous capacity triggers required for suitable backhaul transport that is critical to meet the end-to-end service delivery requirements. Additionally, in yet another aspect, the SPE 202 and/or the SDAE 204 can interwork with the NSSF 208 across multi-vendor radio access network (RAN) slice components to ensure that the requested services from mobility users/devices are served with the agreed upon quality of service requirements.

The mobility core slice functions are to be designed and operated in a more intelligent, dynamic, and/or flexible manner with centralized as well as distributed slice allocation and horizontal and/or vertical scaling of slice functions and sub-slice functions within a given slice or across multiple slices on demand. These slicing functions operating with multi-vendor application software and across multi-vendor radio access networks can have a direct open-standards based data feed via the real-time O&M component 206.

According to an embodiment, the O&M component 206 can process raw data from all the CN functions in a CN slice, and/or across all CN slices inline, and can perform cross-correlations based on various factors, such as, but not limited to, a UE context basis. Such contextual data correlation can be performed within a slice or across multiple slices to maintain the service continuity and/or quality. Results of network function and/or slice specific data analytics can be processed by the SDAE 204 that works across the entire core network slices.

Tracking such CN function and slice metrics proactively in real-time via the SDAE 204 and communicating such information to the SPE 202 and/or the NSSF 208 in a closed-loop manner can create an intelligent hierarchical network repository and performance monitoring system. With such a closed-loop feedback system, the AMF, during the initial registration phase, can obtain the accurate targeted functions desired in-a-slice instance from the NSSF 208 that has a comprehensive view of the network functions resources. The AMF in a given slice can selectively work across the rest of the network functions in the same slice, or across multiple slices and their functions, based on the information received from the NSSF 208 when delivering services to a particular user or device (and/or type of user/device).

Mobility patterns of the users and/or devices can be stored within the SDAE 204 based on their contextual data when transferring across the radio access technologies and its slice components. In one aspect, the NSSF 208 can utilize this pattern data to facilitate offloading the users/devices during critical network congestion scenarios without impacting the priority services offered by the slices within the carrier-defined operating guidelines. With such advanced slice-selection, performance monitoring, and tracking (e.g., via system 200), mobility network resources can be utilized efficiently to support new service dynamics at the mobility edge data center locations on demand.

Additionally, or optionally, for networks with multi-vendor components, the SPE 202 can also analyze metrics associated with vendor specific behaviors for example, to identify a first vendor component that performs better than a second vendor component and/or compare a vendor component's performance against a reference baseline. In one aspect, underperforming vendor components can be removed/swapped based on the level of granularity provided.

Figure 3:
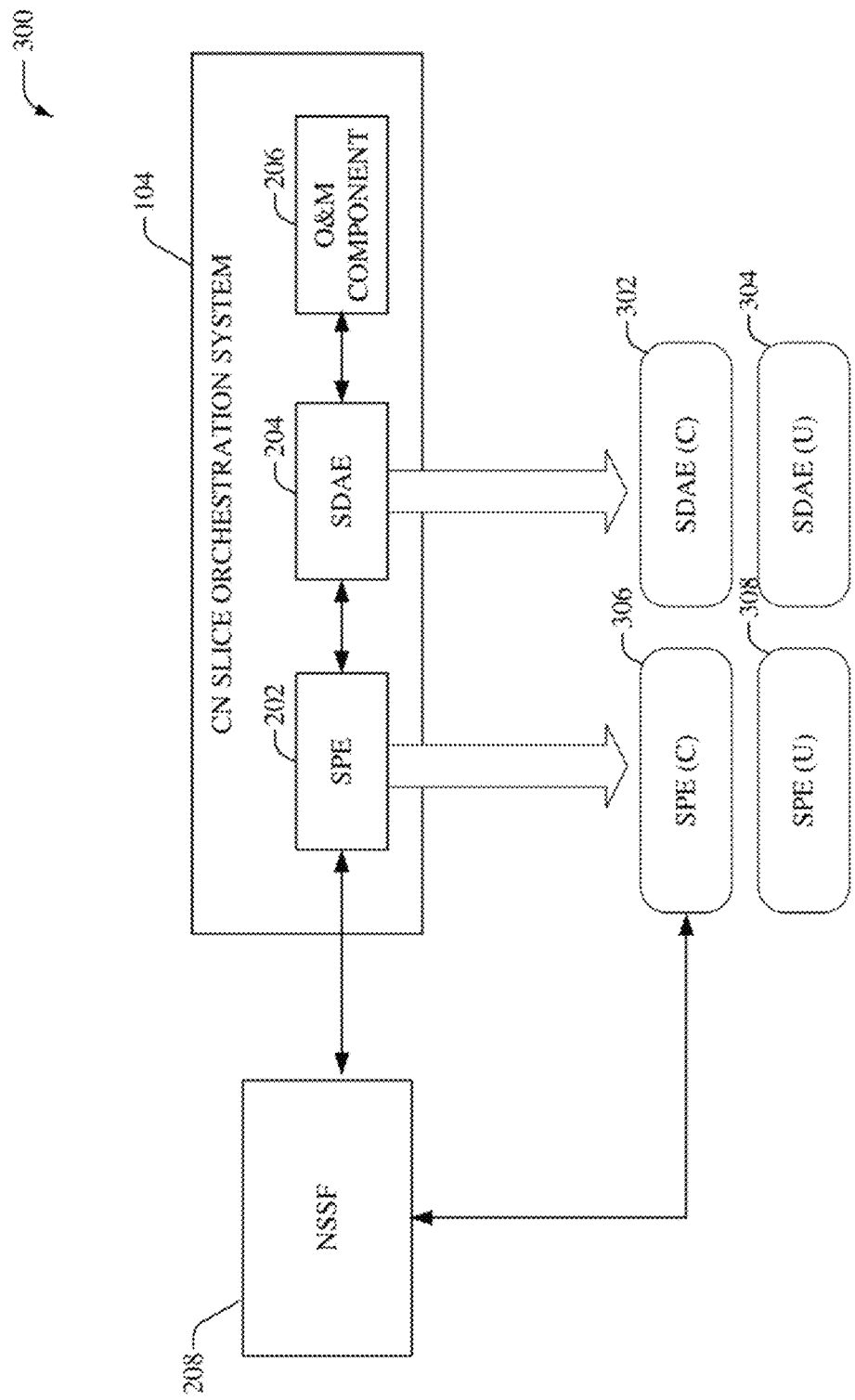
FIG. 3 illustrates an example system for independently tracking and managing control plane functions and user plane functions of a CN slice.

Referring now to FIG. 3, there illustrated is an example system 300 for independently tracking and managing control plane functions and user plane functions within a CN slice, in accordance with an aspect of the subject disclosure. The CN slice orchestration system 104, SPE 202, SDAE 204, O&M component 206, and NSSF 208 can comprise functionality as more fully described herein, for example, as described above with regard to systems 100-200.

The type of services that are to be offered and/or delivered in 5G networks are significantly different from those being delivered via 4G network. For example, 5G networks are being designed to offer/deliver massive IoT services, ultra reliable/low latency communication, augmented reality (AR)/virtual reality (VR) and/or other streaming services, autonomous driving/vehicle services, and/or other delay sensitive applications/services. To support these type of services, CN functions can be distributed and moved closer to edge locations (e.g., based on Multi-access Edge Computing (MEC)). According to an embodiment, the network architecture can be evolved to separate the control plane and user plane functions, and move them towards the edge.

Initially, at least the user plane functions can be moved closer to the edge. For example, centralized data centers can perform control plane functions, while distributed (e.g., closer to the edge) data centers can perform user plane functions. Moreover, since user plane functions can be deployed very close to UEs, the round trip time (RTT) between UEs and data network for applications, for example, that require low latency, can be significantly reduced. Typically, the user plane routes user traffic while the control plane routes signaling in the network. As an example, user plane functions can comprise, but are not limited to, a user plane function (UPF) and control plane functions can comprise, but are not limited to, the AMF, SMF, PCF, AF, AUSF, UDM, etc.

Separating the user and control planes can allow the CN slice orchestration system 104 to monitor and scale (if needed) each plane behaviors together as well as separately. As an example, the CN slice orchestration system 104 can perform data orchestration based on most any deployment strategy defined by the network operator. Conventionally, monitoring has been performed at a core network level, wherein each network component has its own vendor-defined tracking/management mechanism. In contrast, the CN slice orchestration system 104 is vendor agnostic and can track control plane function and user plane functions, within a given CN slice, separately. Based on an analysis of the tracked data, the SPE 202 can evaluate the utilization of resources of the CN slice to scale individual portions (e.g., control plane functions and/or user plane functions) of the CN slice. In an aspect, a the SDAE 204 can be granular and comprise a SDAE(C) 302 that can monitor control plane network functions at individual slice level (and/or across multiple slices within the network). For example, the SDAE (C) 302 can track raw data and/or metrics associated with control plane network functions. In another aspect, the SDAE 204 can comprise a SDAE(U) 304 that can monitor user plane network functions at individual slice level (and/or across multiple slices within the network). For example, the SDAE(U) 304 can track raw data and/or metrics associated with user plane network functions.

Further, the SPE 202 can comprise a SPE(C) 306 and a SPE(U) 308. The SPE(C) 306 can be utilized to track the control plane functions and their behaviors (e.g., resource utilization), while the SPE(U) 308 can be utilized to track the user plane data forwarding functions and their behaviors (e.g., resource utilization). The tracked data (e.g., tracked by SDAE(C) 302, SDAE(U) 304, SPE(C) 306, and/or SPE(U) 308) can be analyzed to dynamically determine (e.g., via the CN slice orchestration system 104) how to optimize the network control and user planes to improve service quality and/or meet service requirements for the slice. For example, based on an analysis of the tracked data, it can be determined that a portion, e.g., control plane elements and/or user plane elements, can be scaled (e.g., for a defined and/or determined time period) to meet the requirements for a service for which the slice has been instantiated.

It is noted that this concept can be extended to broader slicing architecture, wherein once slicing orchestration is performed for a slice of a first service serving a first vertical, the concept can be expanded to another second slice of a second service serving a second vertical. For example, the first slice is of a service associated with an agricultural sector, while the second slice is of another service associated with a medical health sector, both of which have fundamentally different requirements (e.g., latency, bandwidth, quality or service (QoS), etc.). Due to these different requirements, the scaling aspects for control plane and user plane functions will be different for each different slice. By tracking and analyzing the control plane functions and the user plane functions separately, the CN slice orchestration system 104 can determine how each service is being offered to the customer and/or what type of network resources are actually being consumed so that appropriate data centers (e.g., control plane and/or user plane) can be evolved and/or updated and optimally utilized in terms of resources.

Figure 4:
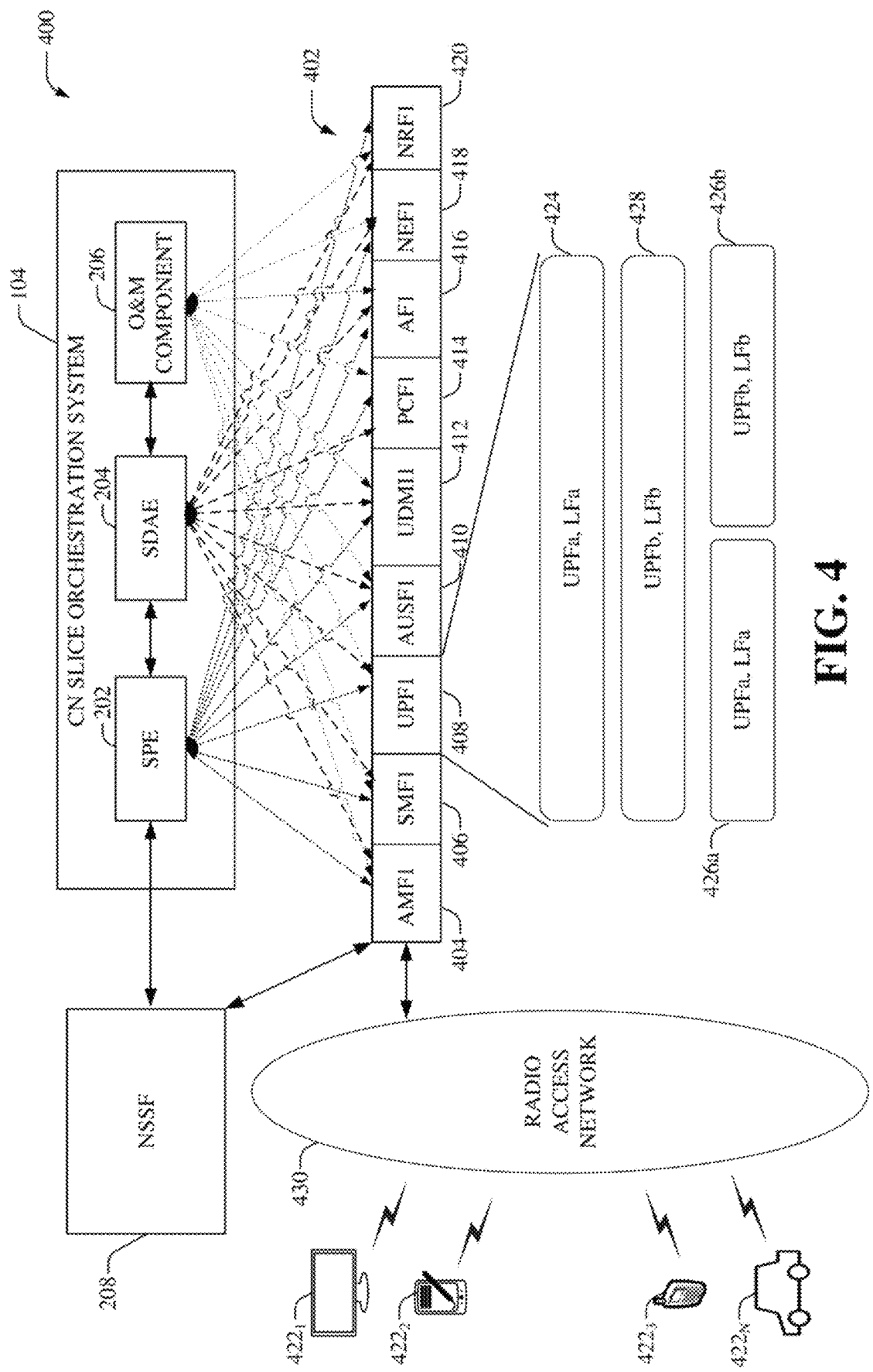
FIG. 4 illustrates an example system that facilitates scaling a function within a CN slice.

According to an embodiment, the separation of tracking and analyzing the control plane functions and the user plane functions enables the CN slice orchestration system 104 and the NSSF 208 flexibility to instantiate a specific function and/or sub-function within the slice. For example, if SPE (C) 306 determines that it has 80% resource utilization due to an over utilized AMF, an additional AMF can be instantiated and the NSSF 208 can steer traffic from newly registered UEs to the additional AMF. Similarly, additional functions can be de-instantiated when determined that resources are not being utilized and/or being under utilized Referring now to FIG. 4, there illustrated is an example system 400 that facilitates scaling a function within a CN slice, according to an aspect of the subject disclosure. It is noted that the CN slice orchestration system 104, SPE 202, SDAE 204, O&M component 206, and NSSF 208 can comprise functionality as more fully described herein, for example, as described above with regard to systems 100-300. System 400 depicts an example CN slice 402 that comprises core network functions such as (but not limited to), AMF 1 (404), SMF 1 (406), UPF 1 (408), AUSF 1 (410), UDMI 1 (412), PCF 1 (414), AF 1 (416), network exposure function (NEF) 1 (418), NRF 1 (420).

According to an embodiment, individual functions/components (404-420) of the CN slice 402 can be monitored and scaled dynamically (e.g., by the CN slice orchestration system 104) to meet the instantaneous mobility services needs of the users (e.g., user equipment (UEs) and/or devices $422_1$-$422_N$; wherein N is most any integer) in that specific region at any given time for a specified duration (e.g., a variable time period). As an example, the UEs and/or devices $422_1$-$422_N$ can comprise, but are not limited to most any industrial automation device and/or consumer electronic devices, for example, a tablet computer, a digital media player, a wearable device, a digital camera, a media player, a cellular phone, a personal computer, a personal digital assistant (PDA), a smart phone, a laptop, a gaming system, set top boxes, home security systems, an IoT device, a connected vehicle, at least partially automated vehicle (e.g., drones), etc. As described above, the CN slice orchestration system 104 can monitor the functions/components (404-420) of the CN slice 402 individually (and/or can monitor groups of user plane functions separately from groups of control plane functions). The individual components (404-420) of the CN slice 402 can expose their tracking information (e.g., load factors (LFs)) to the SDAE 204 directly, or through the O&M component 206 (e.g., depending on operator preference and/or other requirements). In addition, the individual components (404-420) can also provide tracking attributes directly to the SPE 202.

In one example, UPF 1 (408) comprise a single slice function 424 with load factor LFa or multiple sub-slice functions 426a-426b with different load factors (e.g., LFa and LFb, respectively). According to an aspect, the CN slice orchestration system 104 can utilize the load factors to individually scale the UPF 1 (408) within the CN slice 402. For example, if determined that the UPF 1 (408) is the only function in the CN slice 402 facing memory and/or processing utilization issues (e.g., due to handling a large group of users), the CN slice orchestration system 104 can individually scale UPF 1 (408), without changing the other network functions in the CN slice 402. For example, an additional instance, UPFb 428, can be instantiated and to facilitate load balancing. In one aspect, the additional instance can be instantiated for a defined time period that can be dynamically adjusted based on the service delivery dynamics offered in the region (e.g., during an event). Accordingly, the CN slice orchestration system 104 can provide an ability to scale the UPF 1 (408) based on operator-defined engineering rules, which is critical to meet the service dynamics needs of active users in a given area. Scaling the UPF 1 (408) within the CN slice 402 is based on information related to available resources (e.g., compute, memory, storage, services etc.) for that composite slice and such information can be determined in real-time via the CN slice orchestration system 104. The scaled UPF can work with the RAN 430 and rest of the network functions to deliver the instantaneous service delivery needs at a particular edge location.

It is noted that the subject disclosure is not limited to above described monitoring and/or scaling of the UPF 1 (408) and can be utilized to track and/or scale most any function and/or group of functions of a CN slice (e.g., based on direct communications between the CN slice orchestration system 104 and the NSSF 208). In one example, AMF 1 (404) performs access and mobility management functions and manages device context for different type of devices and/or services associated with the CN slice 402. When a UE (e.g., 422₁-422_N) registers with the network and is directed (e.g., by the NSSF 208) to communicate with the AMF 1 (404), the AMF 1 (404) can receive context information associated with the device, store the context information, and provide the entire context information or a portion of the context information to the SDAE 204 (e.g., based on rules provisioned by operator). As an example, AMF 1 (404) can provide context information associated with a particular type of device (e.g., category M, category 3/4, etc.), for example, IoT devices that are performing in a specific category mode. In an aspect, the O&M component 206 collects time series captures of devices that are trying to attach and/or detach from the RAN 430. Typically, O&M component 206 receives raw data collected over a defined time period within a particular network function. For example, the AMF 1 (404) can be configured to report data that is collected for devices (e.g., 422₁-422_N) connected over a defined interval (e.g., 5 minutes, 15 minutes, etc.) The O&M component 206 can process and provide collected information to the SDAE 204 for further processing, for example, based on defined metrics (e.g., session management capabilities, subscription management capabilities, mobility management capabilities, etc. associated with the CN slice 420), which in turn can forward the processed data to the SPE 202.

Further, in an example, the SPE 202 can determine the instantaneous utilization of the CPU, memory, and/or other resource for the AMF 1 (404). According to an aspect, the SPE 202 can analyze the additional data associated with the AMF 1 (404), for example, received via the SDAE 204, O&M component 206, and/or directly from AMF 1 (404) to determine if the AMF utilization satisfies a defined utilization criterion (e.g., AMF utilization is between 60-80%). If determined that the AMF utilization satisfies the defined utilization criterion, the SPE 202 can directly send a trigger to the NSSF 208 to instantiate another AMF 1 (not shown) for the CN slice 402. When new devices (e.g., UEs) attach to RAN 430, the NSSF 208 can route/steer communications from the new devices to the new AMF 1 rather than over utilized AMF 1 (404).

As an example, the UE can comprise, but is not limited to most any industrial automation device and/or consumer electronic devices, for example, a tablet computer, a digital media player, a wearable device, a digital camera, a media player, a cellular phone, a personal computer, a personal digital assistant (PDA), a smart phone, a laptop, a gaming system, set top boxes, home security systems, an IoT device, a connected vehicle, at least partially automated vehicle (e.g., drones), etc.

Figure 5:
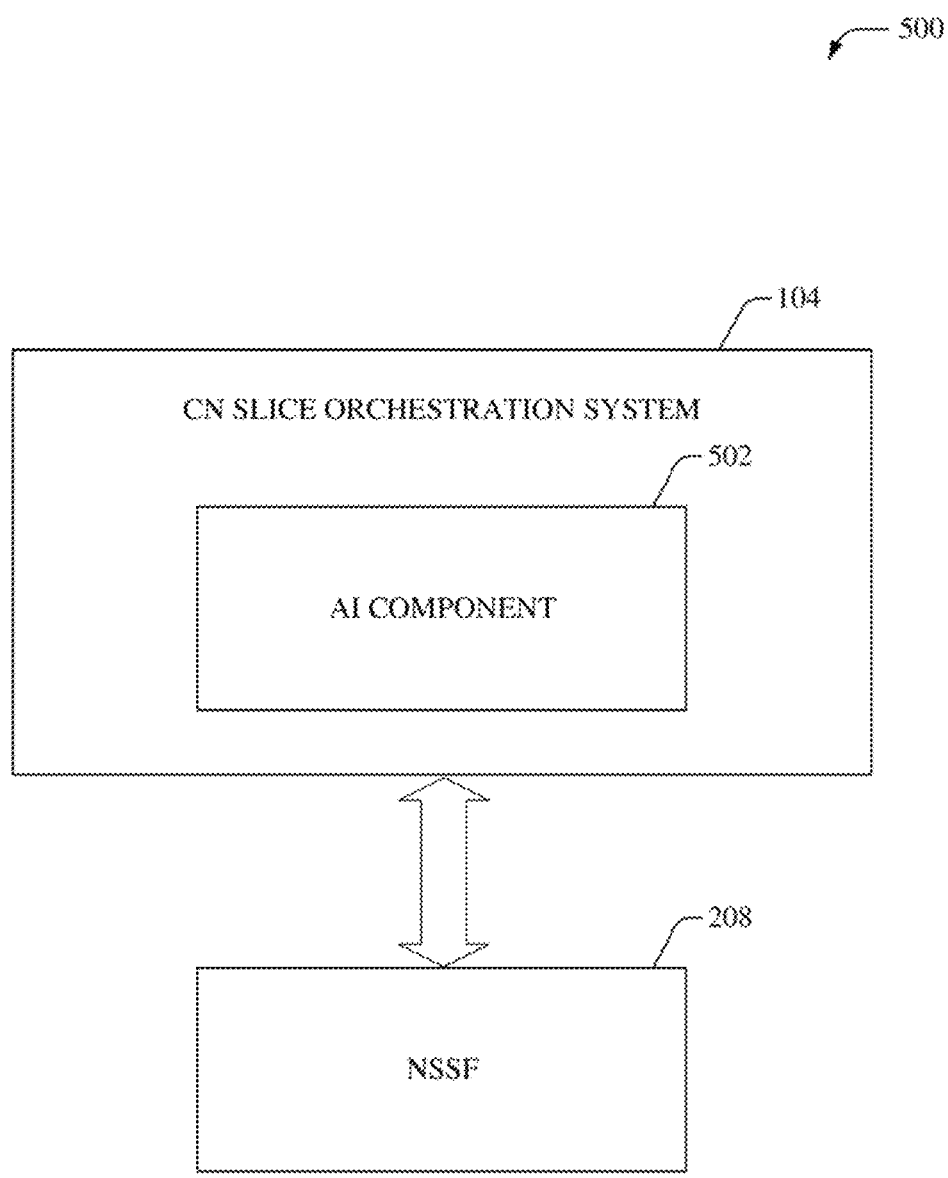
FIG. 5 illustrates an example system that facilitates automating one or more features in accordance with the subject embodiments.

Referring now to FIG. 5, there illustrated is an example system 500 that employs an artificial intelligence (AI) component 502 to facilitate automating one or more features in accordance with the subject embodiments. It can be noted that the CN slice orchestration system 104 and NSSF 208 can comprise functionality as more fully described herein, for example, as described above with regard to systems 100-400.

In an example embodiment, system 500 (e.g., in connection with automatically scaling-up and/or scaling-down network functions) can employ various AI-based schemes (e.g., intelligent processing/analysis, machine learning, etc.) for carrying out various aspects thereof. For example, a process for determining which functions to monitor, determining requirements for a service, determining how to process raw data, determining criterion and/or thresholds for scaling, etc., can be facilitated via an automatic classifier system implemented by AI component 502.

Moreover, the AI component 502 can exploit various artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 502 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 502 can be used to automatically learn and perform a number of functions, comprising but not limited to determining according to a predetermined criteria, the CN functions that are to be monitored, quality metrics for a particular service for which the slice has been instantiated, network evolution, raw data collection and/or processing, scaling-up (and/or scaling-down) individual function(s) of a CN slice, a time period during which the individual function(s) is to be scaled (up and/or down), threshold alerts customized for a slice/service, etc. The criteria can comprise, but is not limited to, historical patterns and/or trends, network operator preferences and/or policies, application/service provider preferences, predicted traffic flows, event data, latency data, reliability/availability data, current time/date, service requirements/characteristics, real-time resource consumption, and the like.

According to an embodiment, the network architecture and systems disclosed herein provides several non-limiting advantages and features such as, but not limited to, (i) an enhanced network slice selection mechanism that utilizes SPE and SDAE engines; (ii) minimizing unnecessary signaling and routing in the mobility transport core network resulting in direct cost savings with efficient data center resources utilization; (iii) intelligent mobility core network design, evolution, and/or adaptation to meet the demands of next-generation massive mobile connectivity, coverage in densified radio environments, new network functions, applications and services, etc.; (iv) distributed and centralized network slice allocations with elastic capabilities in slicing to meet location-specific mobility services on-demand with service provider specific stringent quality requirements; (v) integrated real-time monitoring and data analytics capabilities via the SDAE to track vendor agnostic applications and network functions at individual slice level as well as across multiple slices supported in the network; (vi) open-standards based continuous data exchange between SDAE and SPE in real-time for SPE to take proactive actions with triggers to the NSSF that help in the optimal selection of various network functions for legacy and/or new mobility services delivery; (vii) optimizing CapEx/OpEx investments with on-demand network slicing, slice-specific network functions scaling, and/or support of new mobility services across the available and operational slices; (viii) providing an ability to expose slice specific data analytics via suitable APIs to external service providers and/or developers (e.g., on demand, with trusted partnerships in place); (ix) a cost-effective means to embrace new cellular technologies and drive the adoption of mobile broadband, IoT/machine-type communications (MTC) with cloud based core network architecture.

Figure 6:
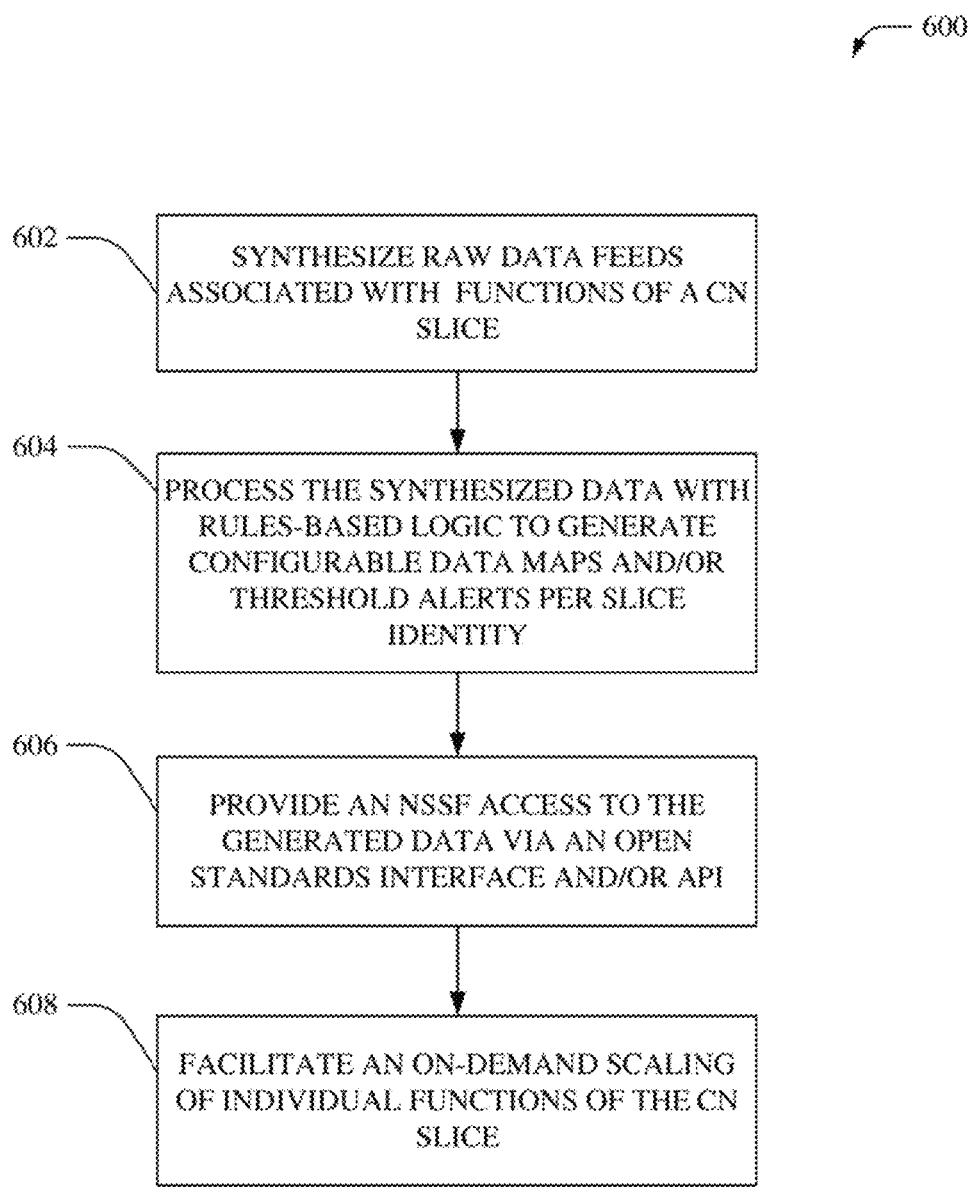
FIG. 6 illustrates an example method that facilitates on-demand scaling of individual functions of a CN slice.
Figure 7:
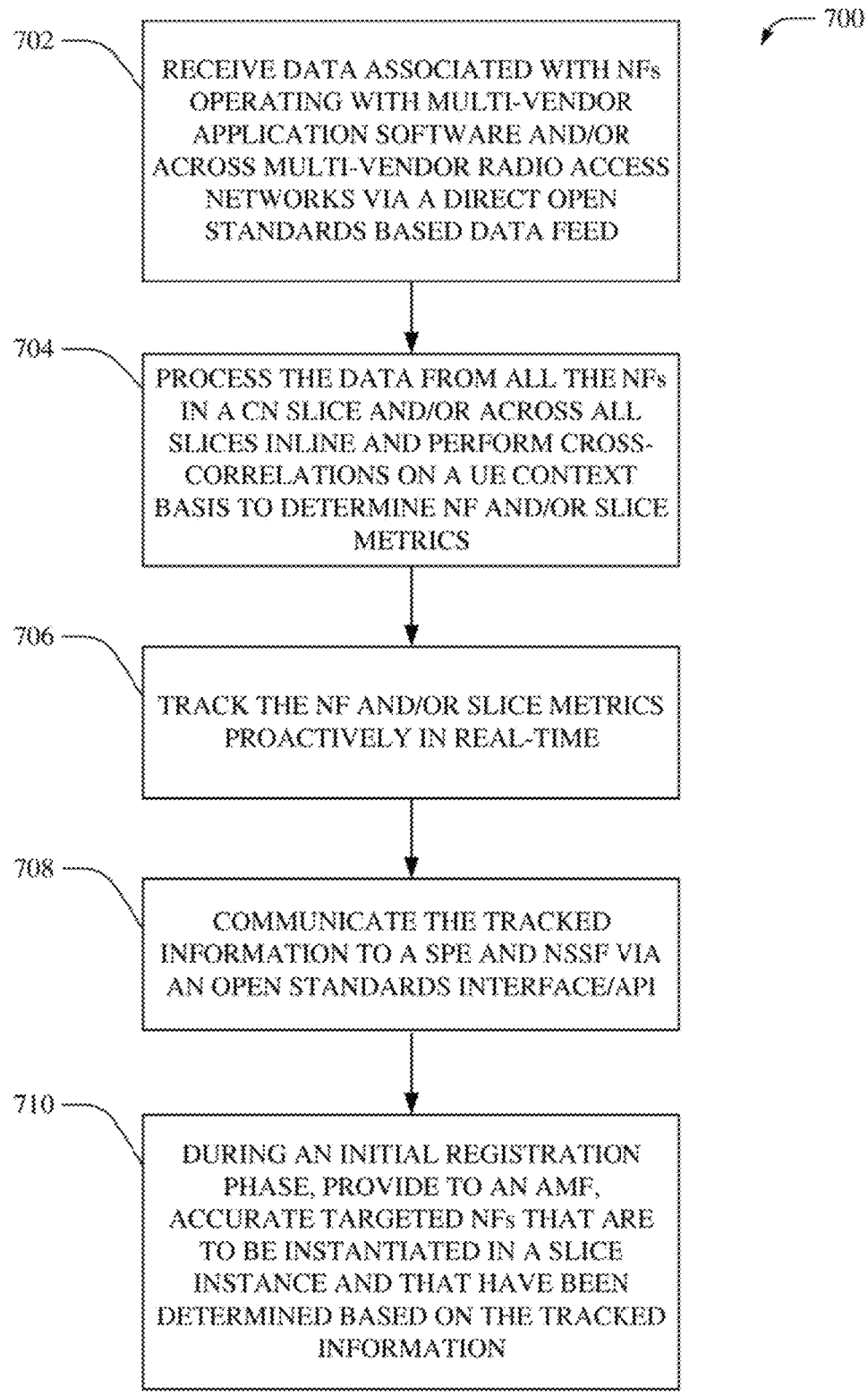
FIG. 7 illustrates an example method that reduces signaling and routing in the mobility transport core network.
Figure 8:
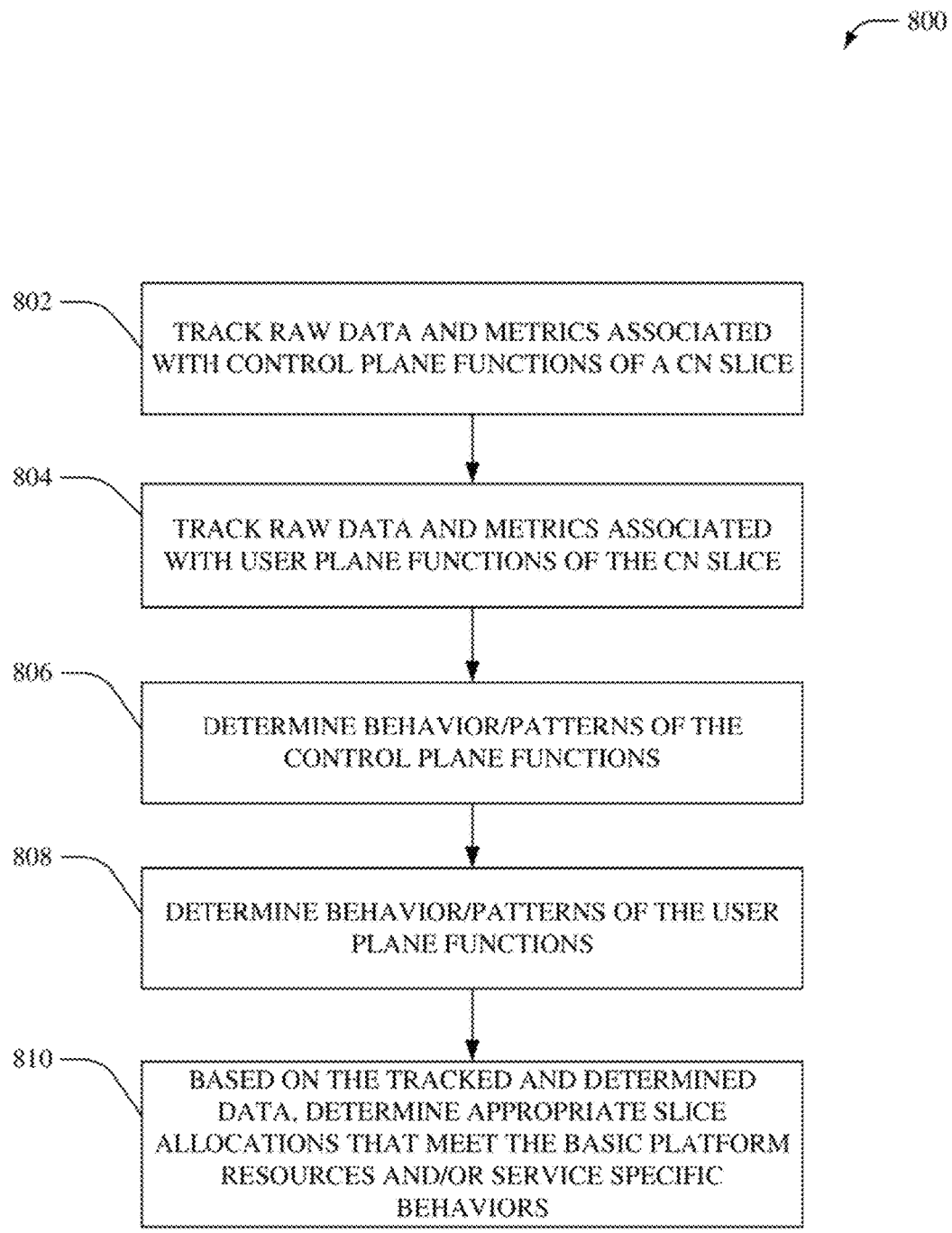
FIG. 8 illustrates an example method that monitors and/or analyzes behaviors of control plane network functions (NFs) and user plane NFs separately.

FIGS. 6-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that facilitates on-demand scaling of individual functions of a CN slice, according to an aspect of the subject disclosure. In an aspect, method 600 can be implemented by one or more network devices (e.g., CN slice orchestration system 104, NSSF 208, etc.) of a communication network (e.g., mobility network). At 602, raw data feeds associated with functions (e.g., data related to function behavior and/or performance, resource consumption, load, etc.) can be collected and synthesized.

At 604, the synthesized data can be processed with rules-based logic (e.g., defined by a network operator) to generate one or more configurable data maps and/or threshold alerts for a slice. Since requirements for different services can vary, the data maps and/or threshold alerts can be customized for a slice instantiated for a particular service. Moreover, the services provided by next generation networks (e.g., 5G network) comprise, but are not limited to, enhanced mobile broadband (eMBB) (e.g., services characterized by high data rates, such as high definition (HD) videos, virtual reality (VR), augmented reality (AR), and fixed mobile convergence (FMC)), ultra-reliable and low latency communications (URLLC) (e.g., latency-sensitive services, such as self-driving, e-health, drone control, etc.), and massive machine type communications (mMTC) (e.g., services that have high requirements for connection density, such as, services for smart city and/or smart agriculture). Each of these service categories has requirements (e.g., resource consumption, latency, bandwidth, etc.) that are significantly (and oftentimes completely) different. Typically, the communication network can support services having diverse requirements for latency, throughput, capacity and/or availability by utilizing network slices, wherein a common network infrastructure can support different types of services via different network slices.

At 606, an NSSF can be provided access to the generated data (e.g., data maps and/or threshold alerts) via an open-standards based interface and/or API. Moreover, the NSSF can be provided with comprehensive information regarding individual network functions to enables intelligent selection and/or scaling of specific network functions. In an aspect, the NSSF can be utilized to select a network slice instance(s) (NSI(s)) to serve a UE and/or determine the network repository function(s) (NRF(s)) to be used to select network functions (NFs)/services within the selected NSI(s). Accordingly, at 608, on-demand scaling of individual functions of the CN slice can be facilitated. This can significantly simplify mobility services assurance.

FIG. 7 illustrates an example method 700 that reduces signaling and routing in the mobility transport core network, according to an aspect of the subject disclosure. In an aspect, method 700 can be implemented by one or more network devices (e.g., CN slice orchestration system 104, NSSF 208, etc.) of a communication network (e.g., mobility network). At 702, data (e.g., data related to function behavior and/or performance, resource consumption, load, etc.) associated with one or more network functions (NFs) that operate with multi-vendor application software and/or across multi-vendor RANs can be received, for example, via a direct open-standards based data feed (e.g., via real-time monitoring). The CN slice functions can be designed and operated in a more intelligent, dynamic, and flexible manner with centralized as well as distributed slice allocation, horizontal and/or vertical scaling of slice functions and sub-slice functions within a given slice or across multiple slices on demand.

At 704, the data received from all the NFs of a CN slice and/or across all slices inline can be processed and cross-correlated based on a UE context data to determine one or more NF and/or slice metrics. In an aspect, the contextual data correlation can be performed within a slice and/or across multiple slices to maintain the service continuity and quality. At 706, the NF and/or slice metrics can be tracked proactively in real-time. Further, at 708, the tracked information (and/or a portion of the tracked information) can be communicated to a SPE and/or NSSF via an open-standards based interface/API, for example, in a closed-loop manner, to create an intelligent hierarchical network repository and performance monitoring system. In an aspect, at 710, during an initial registration phase (e.g., when the UE registers with an access network), accurate targeted NFs that are to be instantiated in a slice instance and that have been determined based on the tracked information, can be provided directly to an AMF (e.g., from the NSSF that has a comprehensive view of the NF resources).

FIG. 8 illustrates an example method 800 that monitors and/or analyzes behaviors of control plane NFs and user plane NFs separately, according to an aspect of the subject disclosure. In an aspect, method 800 can be implemented by one or more network devices (e.g., CN slice orchestration system 104) of a communication network (e.g., cellular network). At 802, raw data and/or metrics associated with control plane functions of a CN slice can be tracked. At 804, raw data and/or metrics associated with user plane functions of a CN slice can be tracked. Further, at 806, behavior and/or patterns associated with the control plane functions can be determined. Furthermore, at 808, behavior and/or patterns associated with the user plane functions can be determined. At 810, appropriate slice allocations that meet the basic platform resources and/or service specific behavior can be determined based on the tracked and/or determined data.

Figure 9:
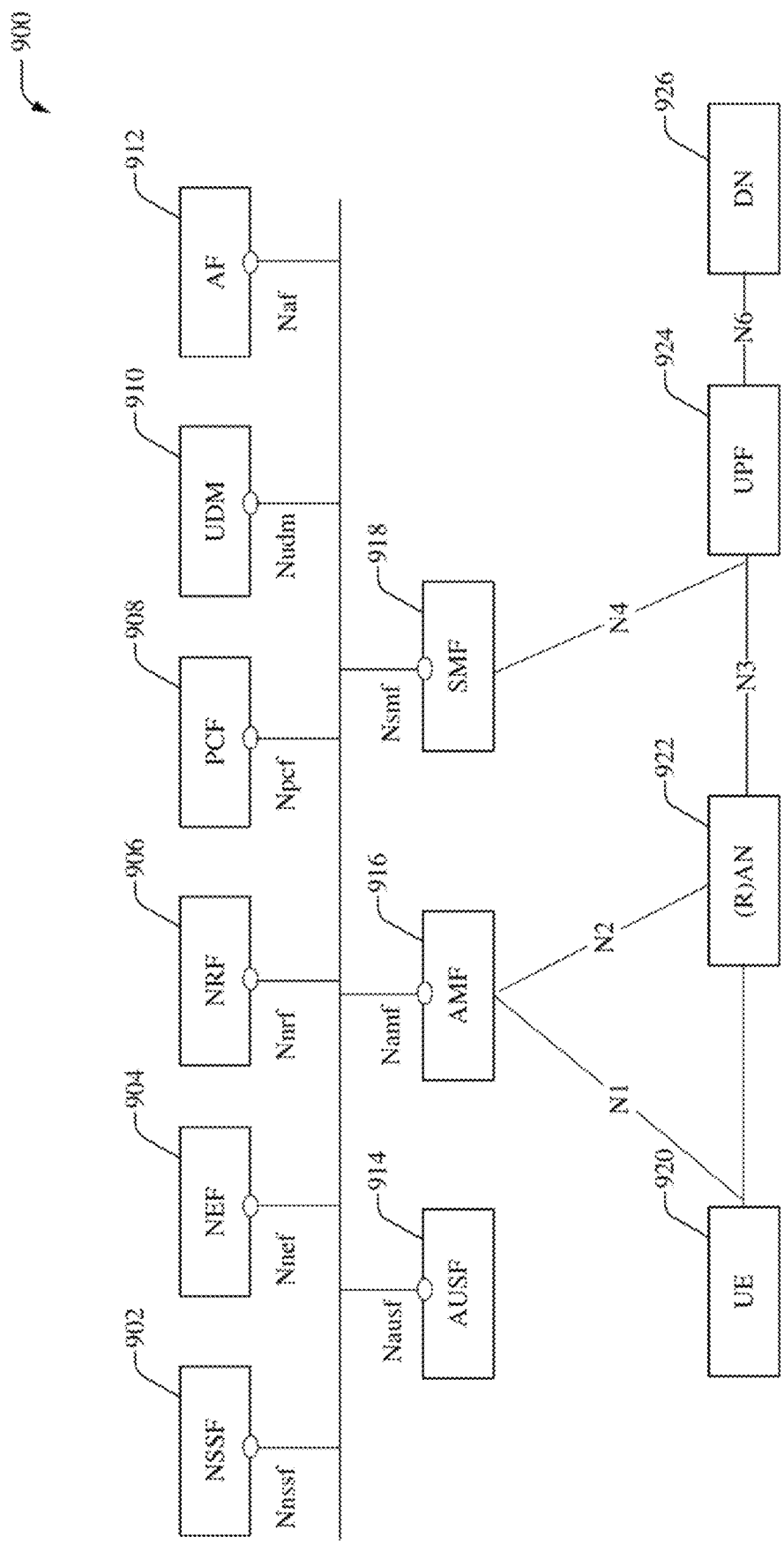
FIG. 9 illustrates an example system that depicts a service-based 5G network architecture.
Figure 10:
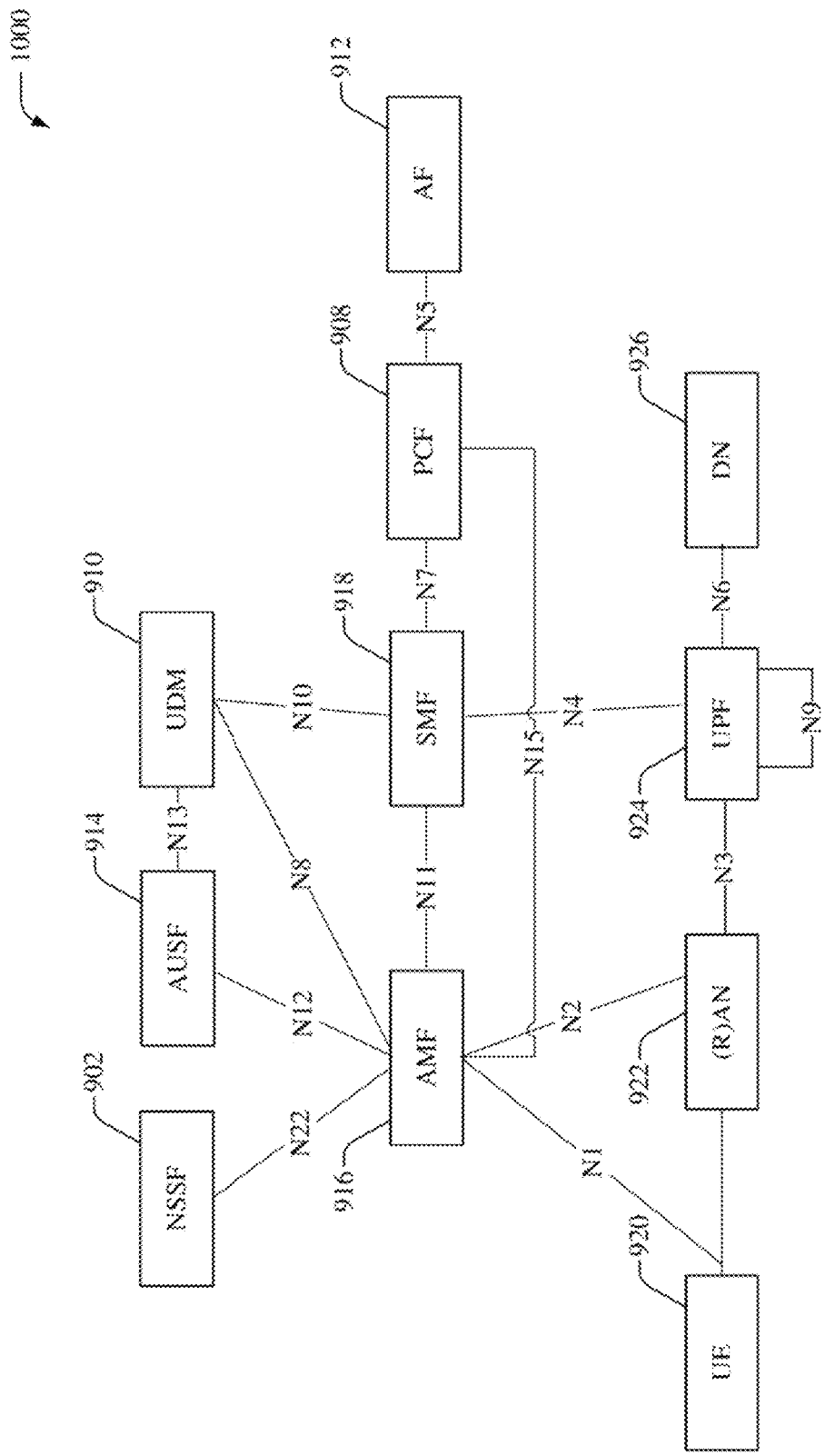
FIG. 10 illustrates an example system that depicts a non-roaming 5G system architecture in reference point representation.

Aspects and embodiments disclosed herein can be implemented in next generation networks, for example, 5G networks. The 5G network architecture is defined as service-based and the interaction between network functions can be represented as shown in FIGS. 9-10. FIG. 9 illustrates an example system 900 that depicts a service-based network architecture, according to an aspect of the subject disclosure. In an aspect, system 900 depicts service-based interfaces being used within the control plane. For example, one network function (e.g., AMF 916) within the control plane can allows other NFs (e.g., NSSF 902, NEF 904, NRF 906, PCF, 908, UDM 910, AF 912, AUSF 914, SMF 918, UPF 924, etc.) that have been authorized, to access its services. This representation also includes point-to-point reference points between the NFs where necessary (e.g., between AMF 916 and UE, 920/(R)AN 922, SMF 918 and UPF 924, (R)AN 922 and UPF 924, UPF 924 and data network (DN) 926).

In an aspect, the AMF 916 can support termination of non-access stratum (NAS) signaling, NAS ciphering and integrity protection, registration management, connection management, mobility management, access authentication and authorization, security context management, etc. The SMF 918 can support session management (e.g., session establishment, modification, release, etc.), UE IP address allocation and management, dynamic host configuration protocol (DHCP) functions, termination of NAS signaling related to session management, downlink (DL) data notification, traffic steering configuration for UPF 924 for proper traffic routing, etc. Further, the UPF 924 can support packet routing and forwarding, packet inspection, QoS handling, can act as external protocol data unit (PDU) session point of interconnect to DN 926, and can be anchor point for intra- and inter-radio access technology (RAT) mobility. A PCF 908 can support unified policy framework, provide policy rules to control plane functions, access subscription information for policy decisions in a unified data repository (UDR), etc. Additionally, the AUSF 914 can comprise an authentication server that authenticates UE 920.

In an aspect, the UDM 910 can support generation of authentication and key agreement (AKA) credentials, user identification handling, access authorization, subscription management, etc. The AF 912 can support application influence on traffic routing, accessing NEF 904, interaction with policy framework for policy control, etc. Further, the NEF 904 can support exposure of capabilities and events, secure provision of information from external application to 3GPP network, translation of internal/external information, etc. Furthermore, the NRF 906 can support service discovery function, maintains NF profile and available NF instances, etc. According to an embodiment, the NSSF 902 can support selecting of the network slice instances to serve the UE 920 that registers via (radio) access network ((R)AN) 922, determining the allowed network slice selection assistance information (NSSAI), determining the AMF (e.g., AMF 916) set to be used to serve the UE, etc. The NSSF 902 can be substantially similar to NSSF 208 and can comprise functionality as more fully described herein, for example, as described above with regard to NSSF 208.

FIG. 10 illustrates an example system 1000 that depicts a non-roaming 5G system architecture in reference point representation, according to an aspect of the subject disclosure. In one aspect, system 1000 focuses on the interactions between pairs of network functions defined by point-to-point reference point (e.g., N7) between any two network functions. This kind of representation is used when some interaction exists between any two network functions. It is noted that NSSF 902, PCF, 908, UDM 910, AF 912, AUSF 914, AMF 916, SMF 918, UE 920, (R)AN 922, UPF 924, and DN 926, can comprise functionality as more fully described herein, for example, as described above with regard to system 900. It should be noted that although various aspects and embodiments have been described herein in the context of 5G networks, the disclosed aspects are not limited to 5G technology and can be applied to other future wireless communication technologies and their evolutions.

Figure 11:
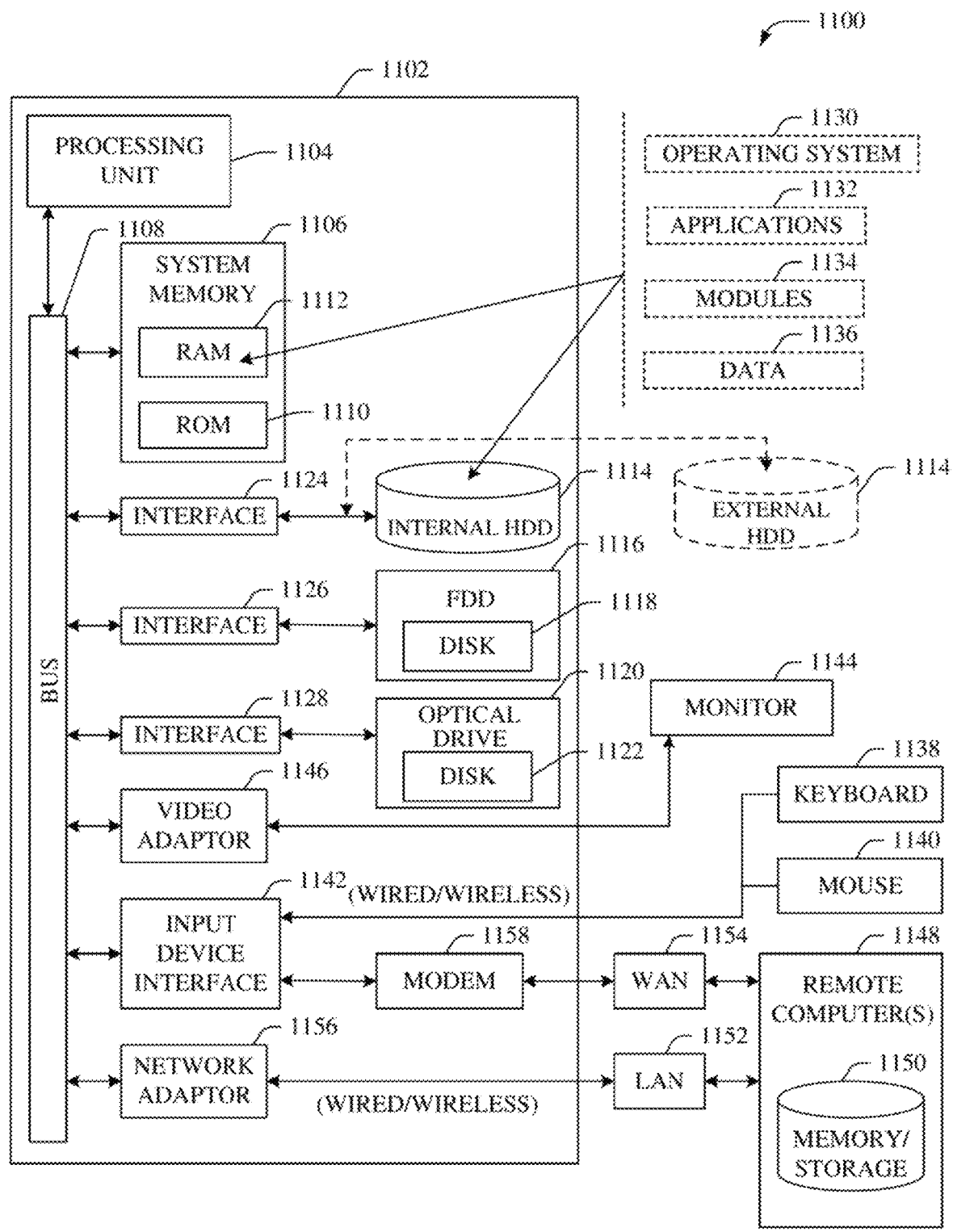
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), application(s) server(s), equipment, system(s), interface(s), gateway(s), controller(s), node(s), engine(s), entity(ies), function(s), center(s), point(s) and/or device(s) (e.g., CN slices 102, CN slice orchestration system 104, control plane component(s) 106, user plane component(s) 108, SPE 202, SDAE 204, O&M component 206, NSSF 208, SDAE(C) 302, SDAE(U) 304, SPE(C) 306, SPE(U) 308, AMF 1 404, SMF 1 406, UPF 1 408, AUSF 1 410, UDMI 1 412, PCF 1 414, AF 1 416, NEF 1 418, NRF 1 420, UE and/or devices $422_{1-N}$, RAN 430, AI component 502, NSSF 902, NEF 904, NRF 906, PCF, 908, UDM 910, AF 912, AUSF 914, AMF 916, SMF 918, UE 920, (R)AN 922, UPF 924, and DN 926, etc.) disclosed herein with respect to systems 100-700 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an infrared (IR) interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
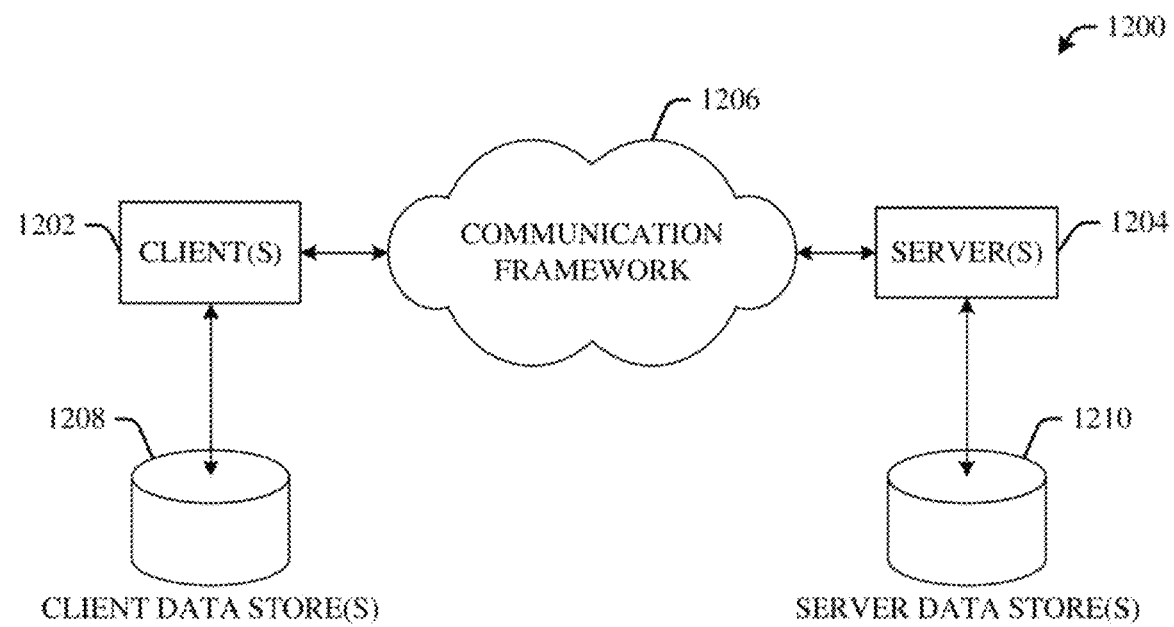
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method comprising:
   instantiating, by a system comprising a processor and based on load factors relating to utilization of a first network function instance operating within a core network slice, a second network function instance within the core network slice, the second network function instance being distinct from the first network function instance, wherein the instantiating comprises instantiating the second network function instance without modifying other network function instances, other than the first network function instance, operating within the core network slice;
   determining, by the system and in response to the instantiating, a length of a defined time period based on predicted traffic flows associated with the core network slice; and
   de-instantiating, by the system, the second network function instance in response to the defined time period being determined to have concluded.

2. The method of claim 1, further comprising:
   selecting, by the system, the first network function instance according to a criterion; and
   monitoring, by the system, the load factors relating to the utilization of the first network function instance in response to the selecting.

3. The method of claim 2, wherein the criterion comprises a policy of a network operator associated with the core network slice.

4. The method of claim 1, wherein the instantiating is in further response to resources within the core network slice for the instantiating being determined to be available.

5. The method of claim 1, wherein the first network function instance is a first instance of a network function, and wherein the second network function instance is a second instance of the network function.

6. The method of claim 5, wherein the network function is a user plane function.

7. The method of claim 5, wherein the network function is an access and mobility management function.

8. A system comprising:
   a processor; and
   a memory that stores executable instructions that, when executed by the processor, facilitate performance of operations, the operations comprising:
      instantiating, based on load factors associated with a first network function instance operating within a core network slice, a second network function instance, different from the first network function instance, within the core network slice, wherein the instantiating comprises instantiating the second network function instance without modifying other network function instances, other than the first network function instance, operating within the core network slice;
      in response to the instantiating, determining a length of a defined time interval based on predicted traffic flows associated with the core network slice; and
      de-instantiating the second network function instance in response to determining that the defined time interval has elapsed.

9. The system of claim 8, further comprising:
   selecting the first network function instance based on a selection criterion; and
   monitoring the load factors associated with the first network function instance in response to the selecting.

10. The system of claim 9, wherein the selection criterion comprises a policy of a network operator associated with the core network slice.

11. The system of claim 8, wherein the instantiating is in further response to determining that resources for the second network function instance are available within the core network slice.

12. The system of claim 8, wherein the first network function instance is a first instance of a network function, and wherein the second network function instance is a second instance of the network function.

13. The system of claim 12, wherein the network function is a user plane function.

14. The system of claim 12, wherein the network function is an access and mobility management function.

15. A non-transitory machine-readable medium, comprising executable instructions that, when executed by a processor, facilitate performance of operations, the operations comprising:
   instantiating, based on load factors indicative of utilization of a first network function instance associated with a core network slice, a second network function instance associated with the core network slice, the second network function instance being different from the first network function instance, wherein the instantiating comprises instantiating the second network function instance without modifying other network function instances, other than the first network function instance, operating within the core network slice;
   determining a length of a time interval based on predicted traffic flows associated with the core network slice; and
   in response to expiration of the time interval, de-instantiating the second network function instance.

16. The non-transitory machine-readable medium of claim 15, wherein the operations further comprise:
   selecting the first network function instance according to a policy of a network operator associated with the core network slice; and
   monitoring the load factors indicative of the utilization of the first network function instance in response to the selecting.

17. The non-transitory machine-readable medium of claim 15, wherein the instantiating is in further response to determining that resources for the second network function instance are available within the core network slice.

18. The non-transitory machine-readable medium of claim 15, wherein the first network function instance is a first instance of a network function, and wherein the second network function instance is a second instance of the network function.

19. The non-transitory machine-readable medium of claim 18, wherein the network function is a user plane function.

20. The non-transitory machine-readable medium of claim 18, wherein the network function is an access and mobility management function.

* * * * *